United States Patent [19]

Tachihara

[11] Patent Number: 4,726,667
[45] Date of Patent: Feb. 23, 1988

[54] FOCUSING METHOD IN OPTICAL LENS SYSTEM WITH VARIABLE FOCAL LENGTH

[75] Inventor: Satoru Tachihara, Tokyo, Japan

[73] Assignee: Asahi Kogaku Kogyo Kabushiki Kaisha, Tokyo, Japan

[21] Appl. No.: 662,742

[22] Filed: Oct. 19, 1984

[51] Int. Cl.⁴ .......................................... G02B 15/177
[52] U.S. Cl. ........................................ 350/426; 350/423
[58] Field of Search ................. 350/426, 428, 423, 427

[56] References Cited

U.S. PATENT DOCUMENTS

| | | | |
|---|---|---|---|
| 4,447,135 | 5/1984 | Nakamura | 350/426 |
| 4,465,343 | 8/1984 | Horimoto | 350/426 |
| 4,492,437 | 1/1985 | Masumoto et al. | 350/428 |
| 4,516,839 | 5/1985 | Tokumaru | 350/426 |
| 4,586,793 | 5/1986 | Tanaka et al. | 350/426 |

FOREIGN PATENT DOCUMENTS 58-137812  8/1983  Japan ..................... 350/423

Primary Examiner—John K. Corbin
Assistant Examiner—Scott J. Sugarman
Attorney, Agent, or Firm—Sughrue, Mion, Zinn, Macpeak, and Seas

[57] ABSTRACT

A focusing method in an optical lens system with a variable focal length is composed, in order from an object, of a first lens group having a negative refractive power, and a second lens group having a positive refractive power, with an air gap therebetween being variable for varying the refractive power. The second lens groups is divided into at least two lens groups. At least one of the last-mentioned lens groups is movable simultaneously for focusing and has a magnification which will not be −1 while varying power and focusing.

5 Claims, 9 Drawing Figures

FIG. 1

$$\Delta = (1 - m^2) \cdot \delta$$

FOCUSING METHOD IN OPTICAL LENS SYSTEM WITH VARIABLE FOCAL LENGTH

BACKGROUND OF THE INVENTION

The present invention relates to an optical lens system with a variable focal length, and more particularly to a focusing method in an optical lens system with a variable focal length including a wide-angle setting.

Recent years have been wide-spread use of so-called zoom lenses. Standard zoom lenses, in particular, including wide-angle to telephoto regions or settings with a standard angle of view therebetween are becoming one of the most popular lenses because of a handy size thereof. As is well known, automatic focusing (hereinafter referred to as an "AF") lenses which have started to be used in compact cameras are employed in many cameras since they are quite convenient to use.

However, few arrangements are known in which a zoom lens and an AF mechanism are combined so that they cooperate with each other. One reason is that since the zoom lens is necessarily large in size, its incorporation in a compact camera would make the camera no longer compact. There are a very few examples in which an AF mechanism is combined with a zoom lens designed for a single-lens reflex camera. However, such an assembly requires a motor for driving the AF mechanism, a power supply, and an equipment for measuring the object distance, and hence is larger, heavier, and costlier than an ordinary combination of a single-lens reflex camera and a zoom lens. All of the known examples employ a front-group moving system called front lens focusing for focusing the lenses. The front lens group is generally large in diameter and heavy and requires to be driven by a large-power motor. The front-group moving system is therefore disadvantageous in that it requires a large expenditure of electric power, a large-size power supply such as a battery, and results in an overall large size.

SUMMARY OF THE INVENTION

With the foregoing problems in view, it is an object of the present invention to provide a focusing method which requires only a small expenditure of electric power, a small-size motor, and a small-size power supply, thereby achieving a compact and inexpensive optical lens system with a variable focal length for AF.

According to the present invention, there is provided a method of focusing in an optical lens system with a variable focal length, composed, in order from an object, of a first lens group having a negative refractive power, and a second lens group having a positive refractive power, with an air gap therebetween being variable for varying a refractive power, the second lens group being divided into at least two lens components, at least one of the last-mentioned lens components being movable simultaneously for focusing and having a magnification which will not be $-1$ while varying power and focusing.

DETAILED DESCRIPTION OF THE PREFERRED EMBODIMENTS

Generally, the rear group (that is, the second lens group) in the two-group optical lens system with a variable focal length is smaller in diameter and lighter in weight than the front group (that is, the first lens group). Therefore, focusing with the second lens group is effective in reducing the size and weight of the entire system since the drive lens for focusing is lightweight. However, such an arrangement is problematic for the following reason:

In the two-group optical lens system with a variable focal length, the magnification of the second lens group is liable to become $-1$ within the range of the focal length. Now, whether focusing by moving the second lens group under such a condition is possible or not will be considered.

Figure 1:
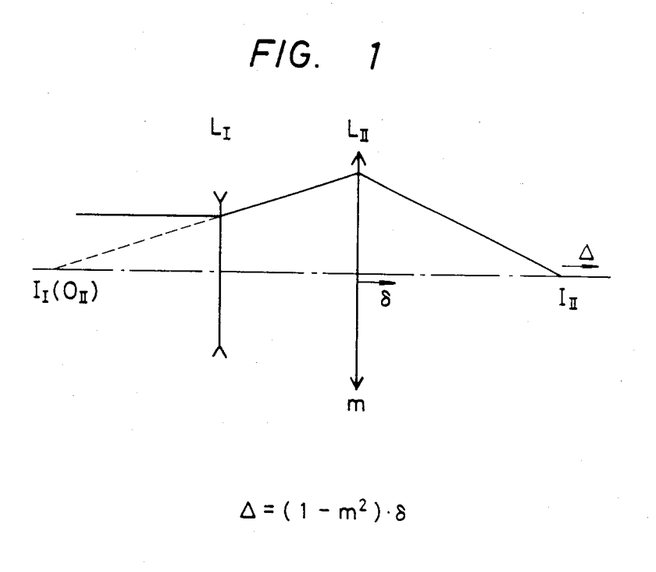
FIG. 1 is a diagram illustrative of the principle of focusing.

With a two-group lens system, as shown in FIG. 1, an image $I_I$ formed by a first lens group $L_I$ serving as a negative lens is an object $O_{II}$ of a second lens group $L_{II}$ serving as a positive lens, and the object $O_{II}$ is focused by the second lens group $L_{II}$ to form a final image $I_{II}$. At this time, the following relationship is met:

$$\Delta = (1 - m^2) \cdot \delta$$

where m is the magnification of the second lens group $L_{II}$, $\delta$ is the interval of small movement of the second lens group $L_{II}$, and $\Delta$ is the interval of movement of the image point $I_{II}$. If the magnification of the second lens group $L_{II}$ is $m = -1$, then $\Delta = \{1 - (-1)^2\} \cdot \delta = 0$ even when the second lens group $L_{II}$ is moved, and the image point is not moved. Stated otherwise, it is impossible to effect focusing with the magnification of $-1$.

Even if the magnification of the second lens group is not $-1$ within the range of the focal length, the focal length of the second lens group itself is generally too long for focusing, and the second lens group is required to be moved too long a distance for focusing. For focusing from a long distance to a short distance by using the second lens group having a positive refractive power, the second lens group is required to be moved toward the object. If the distance of such movement of the second lens group were long, then the second and first lens groups would interfere with each other at a long focal length setting, or a sufficient air gap should be kept between the lens groups to prevent them from mutual interference, an arrangement which would be an obstacle to an effort for making the lens system smaller in size. If the air gap between the first and second lens groups were made large, excessively corrected spherical aberration and chromatic aberration generated by the first lens group could not well be corrected by the second lens group, resulting in a problem with optical performance.

As described above, focusing effected by moving the second lens group has certain drawbacks, and is difficult to put to use though theoretically possible.

According to the present invention, the second lens group is divided into a plurality of lens components, and at least one of the last-mentioned lens components is simultaneously moved and has a magnification which will not be −1 while varying power or focusing. The lens system thus constructed is capable of focusing from a long distance to a short distance with a small movement of the light lens group. The lens system is small in size, light in weight, and low in cost particularly for use as a variable-focal-length lens for AF in a single-lens reflex camera.

The present invention will now be described with reference to Examples thereof.

Figure 2:
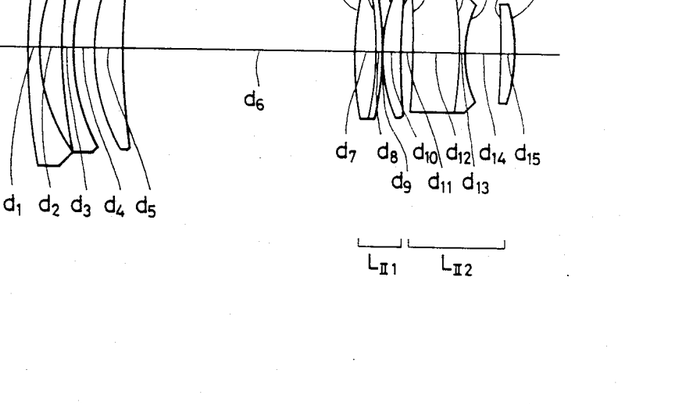
FIG. 2 is a cross-sectional view of lenses according to Example 1.

Example 1 (FIG. 2) shows an optical lens system with a variable focal length, having an F number of 1:4 and a variable power ratio of about 2. A second lens group $L_{II}$ is divided into a II-first lens component $L_{II1}$ having a positive refractive power and a II-second lens component $L_{II2}$ having a negative refractive power, the lens components being arranged in order from an object. Focusing from a long distance to a short distance can be effected by moving the II-first lens component $L_{II1}$ toward the object. By moving the II-first lens component $L_{II1}$ about 1.7 mm from an infinite distance up to the object, focusing can be made up to about 0.3 m at a shortest focal distance setting and about 0.6 m at a longest focal distance setting. With the conventional focusing system in which the front lens group is moved, the diameter of the front lens group is large and the overall size cannot be smaller since a required amount of brightness of the edge of the image field has to be ensured at a short distance. According to the present invention, such a shortcoming is eliminated, and a sufficient amount of brightness of the edge of the image field is ensured up to a short distance with the compact lens system.

For sufficient optical performance from the long to the short distance, care should be exercised about variations in chromatic aberration. It is preferable to make provision for compensating for chromatic aberration in each moving lens group.

Figure 3:
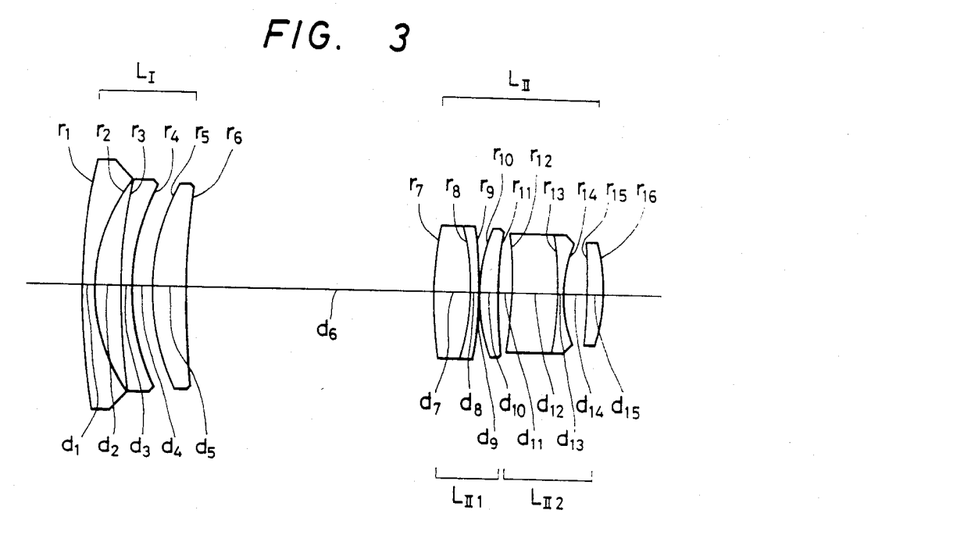
FIG. 3 is a cross-sectional view of lenses according to Example 2.

Example 2 (FIG. 3) shows an optical lens system with a variable focal length, having an F number of 1:4 and a variable power ratio of about 2. A second lens group $L_{II}$ is divided into a II-first lens component $L_{II1}$ having a positive refractive power and a II-second lens component $L_{II2}$ having a negative refractive power, the lens components being arranged in order from an object. Focusing from a long distance to a short distance can be effected by moving the II-second lens component $L_{II2}$ toward an image. By moving the II-second lens group $L_{II2}$ about 2.5 mm from an infinite distance up to the object, focusing can be made up to about 0.3 m at a shortest focal distance setting and about 0.6 m at a longest focal distance setting.

Figure 4:
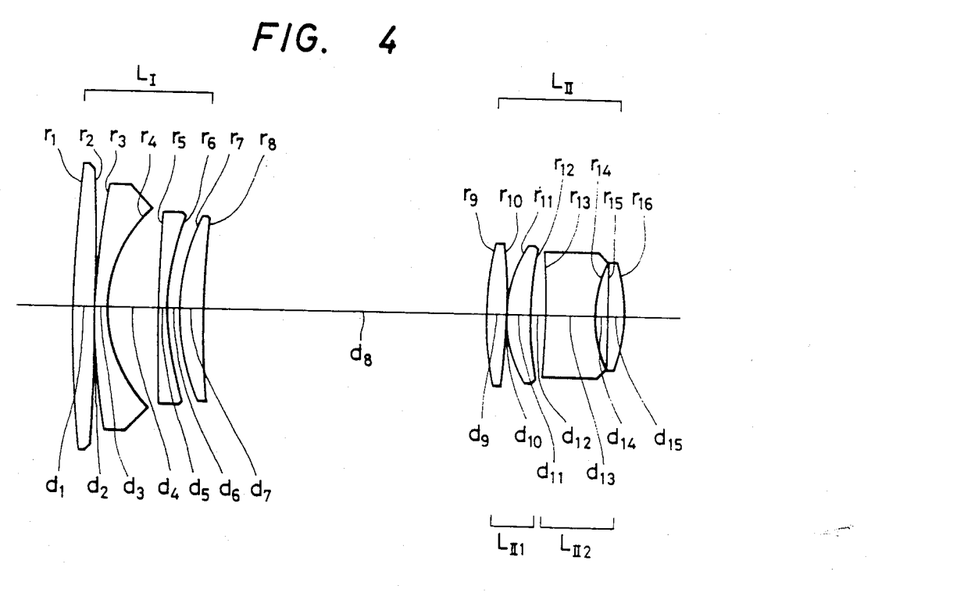
FIG. 4 is a cross-sectional view of lenses according to Example 3.

Example 3 (FIG. 4) shows an optical lens system with a variable focal length, having an F number of 1:4 and a variable power ratio of about 3. As with Example 2, a second lens group $L_{II}$ is divided into a II-first lens component $L_{II1}$ having a positive refractive power and a II-second lens component $L_{II2}$ having a negative refractive power, the lens components being arranged in order from an object. Focusing from a long distance to a short distance can be effected by moving the II-second lens component $L_{II2}$ toward an image. By moving the II-second lens component $L_{II2}$ about 1 mm from an infinite distance up to the object, focusing can be made up to about 0.4 m at a shortest focal distance setting and about 1.2 m at a longest focal distance setting.

Figure 5:
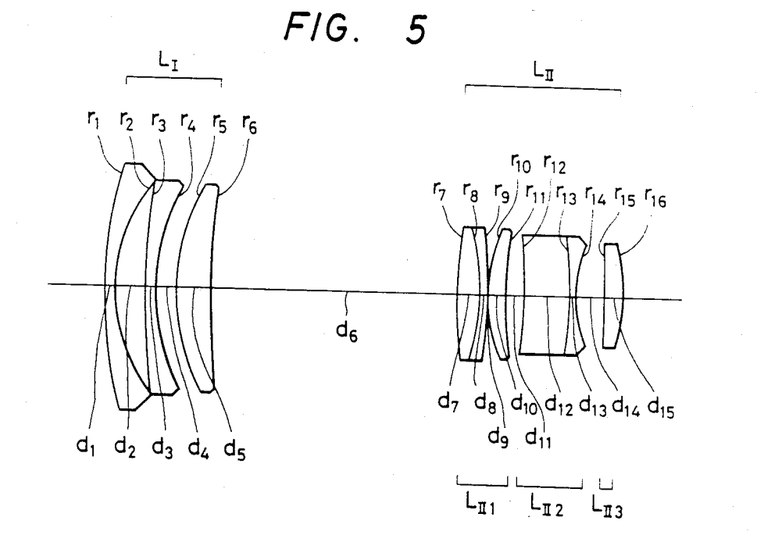
FIG. 5 is a cross-sectional view of lenses according to Example 4.

Example 4 (FIG. 5) shows an optical lens system with variable focal length, having an F number of 1:4 and a variable power ratio of about 2. A second lens group $L_{II}$ is divided into a II-first lens component $L_{II1}$ having a positive refractive power, a II-second lens component $L_{II2}$ having a negative refractive power, and a II-third lens component $L_{II3}$ having a positive refractive power, the lens components being arranged in order from an object. Focusing from a long distance to a short distance can be effected by moving the II-second lens component $L_{II2}$ toward an image. By moving the II-second lens component $L_{II2}$ about 2.2 mm from an infinite distance up to the object, focusing can be made up to about 0.3 m at a shortest focal distance setting and about 0.6 m at a longest focal distance setting.

Figure 6:
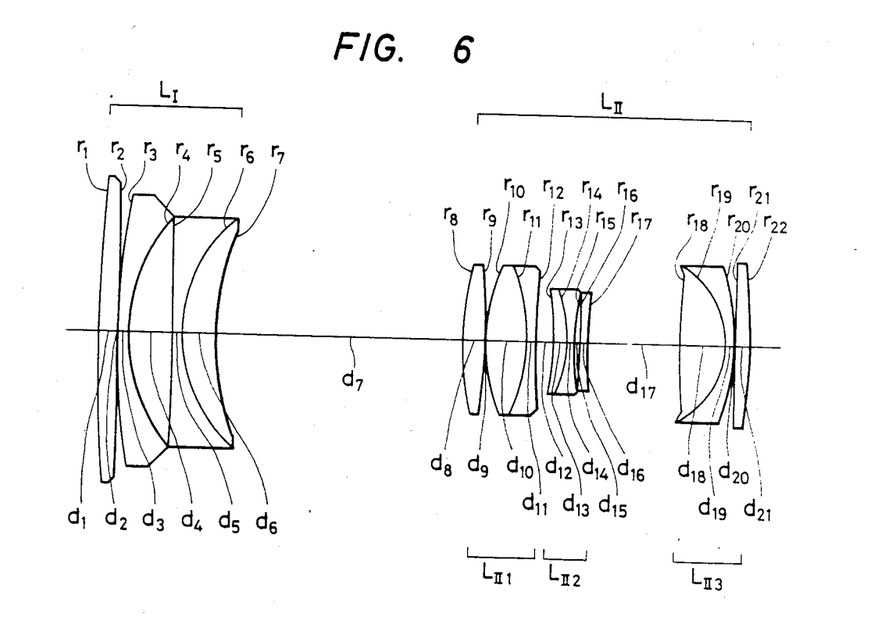
FIG. 6 is a cross-sectional view of lenses according to Example 5.

Example 5 (FIG. 6) shows an optical lens system with a variable focal length, having an F number of 1:4 and a variable power ratio of about 3. A second lens group $L_{II}$ is divided into a II-first lens component $L_{II1}$ having a positive refractive power, a II-second lens component $L_{II2}$ having a negative refractive power, and a II-third lens component $L_{II3}$ having a positive refractive power, the lens components being arranged in order from an object. Focusing from a long distance to a short distance can be effected by moving the II-second lens component $L_{II2}$ toward an image. By moving the II-second lens component $L_{II2}$ about 2.4 mm from an infinite distance up to the object, focusing can be made up to about 0.3 m at a shortest focal distance setting and about 1.5 m at a longest focal distance setting. In this Example, the II-first, II-second, and II-third lens component are independently moved for power variation in addition to movement for focusing. Basically, however, power variation is mainly achieved by varying the air gap between the first lens group $L_I$ having a negative refractive power and the second lens group $L_{II}$ having a positive refractive power in which the II-first, II-second, and II-third lens components are regarded as being combined together. Therefore, such power variation by way of independent movement of the II-first, II-second, and II-third lens components falls within the scope of the invention.

Figure 7:
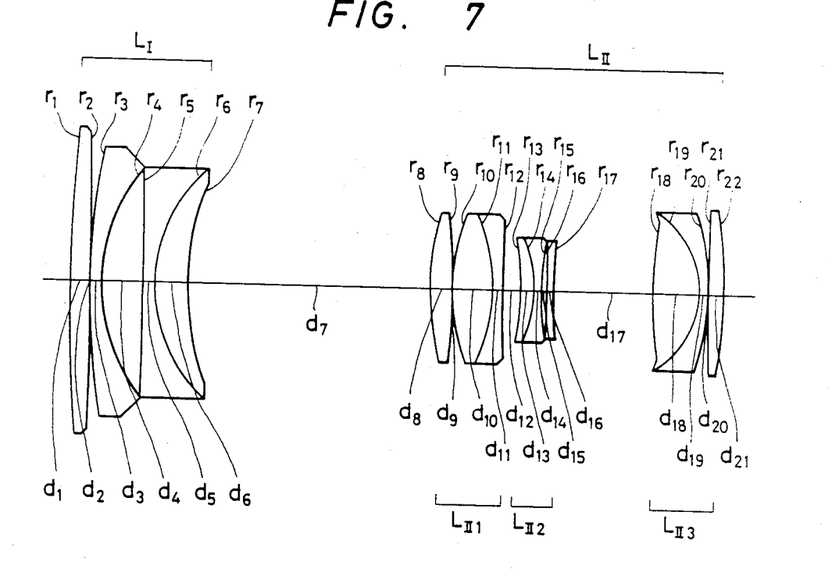
FIG. 7 is a cross-sectional view of lenses according to Example 6.

Example 6 (FIG. 7) shows an optical lens system with a variable focal length, having an F number of 1:4 and a variable power ratio of about 3. A second lens group $L_{II}$ is divided into a II-first lens component $L_{II1}$ having a positive refractive power, a II-second lens component $L_{II2}$ having a negative refractive ower, and a II-third lens component $L_{II3}$ having a positive refractive power, the lens components being arranged in order from an object. Focusing from a long distance to a short distance can be effected by moving the II-third lens component $L_{II3}$ toward the object. By moving the II-third lens component $L_{II3}$ about 5.3 mm from an infinite distance up to the object, focusing can be made up to about 0.3 m at a shortest focal distance setting and about 1.5 m at a longest focal distance setting. In Example 6, the II-first, II-second, and II-third lens components are independently moved for power variation in addition to movement for focusing, as with Example 5. However, such power variation by way of independent movement of the II-first, II-second, and II-third lens components fall within the scope of the invention.

Figure 8:
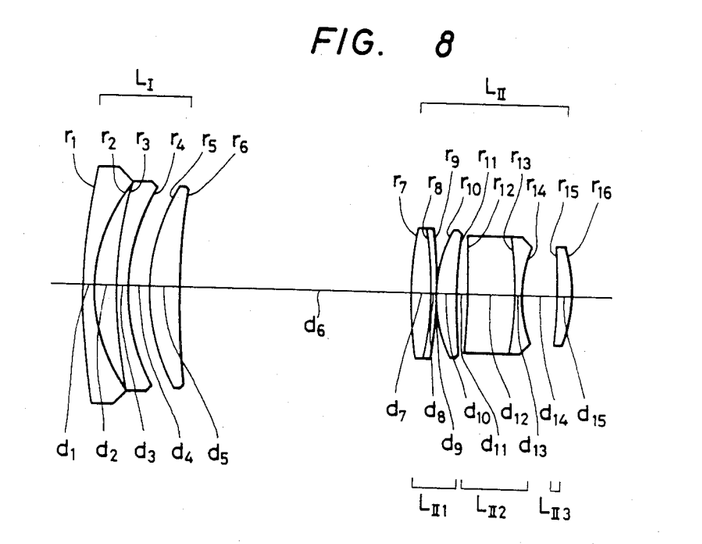
FIG. 8 is a cross-sectional view of lenses according to Example 7.

Example 7 (FIG. 8) shows an optical lens system with a variable focal length, having an F number of 1:4 and a variable power ratio of about 2. A second lens group $L_{II}$ is divided into a II-first lens component $L_{II1}$ having a positive refractive power, a II-second lens component $L_{II2}$ having a negative refractive power, and a II-third lens component $L_{II3}$ having a positive refractive power, the lens components being arranged in order from an object. Focusing from a long distance to a short distance can be effected by moving the II-first lens component $L_{II1}$ and the II-third lens component $L_{II3}$ simultaneously the same interval toward the object. By moving the above two lens component about 1.5 mm from an infinite distance up to the object, focusing can be made up to about 0.3 m at a shortest focal distance setting and about 1.5 m at a longest focal distance setting. The II-first lens component $L_{II1}$ and the II-third lens component $L_{II3}$ may be moved different intervals for better condition of aberrations.

Figure 9:
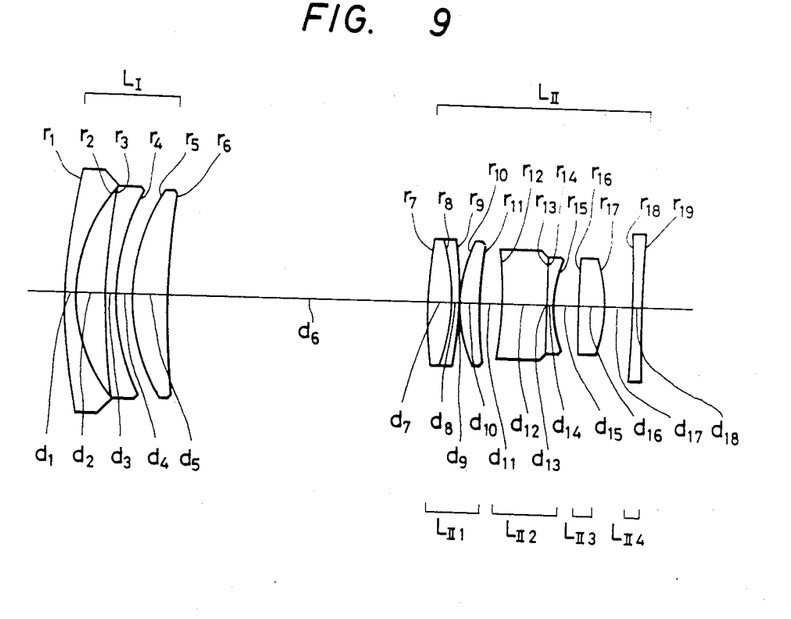
FIG. 9 is a cross-sectional view of lenses according to Example 8.

Example 8 (FIG. 9) shows an optical lens system with a variable focal length, having an F number of 1:4 and a variable power ratio of about 2. A second lens group $L_{II}$ is divided into a II-first lens component $L_{II1}$ having a positive refractive power, a II-second lens component $L_{II2}$ having a negative refractive power, a II-third lens component $L_{II3}$ having a positive refractive power, and a II-fourth lens component $L_{II4}$ having a negative refractive power, the lens components being arranged in order from an object. Focusing from a long distance to a short distance can be effected by moving the II-second lens component $L_{II2}$ toward an image. By moving the II-second lens component $L_{II2}$ about 2 mm from an infinite distance up to the object, focusing can be made up to about 0.3 m at a shortest focal distance setting and about 0.6 m at a longest focal distance setting. In Example 8, the II-fourth lens component $L_{II4}$ remain at rest at all times during power variation and focusing. Basically, however, power variation is mainly achieved by varying the air gap between the first lens group $L_I$ having a negative refractive power and the second lens group $L_{II}$ having a positive refractive power in which the II-first, II-second, II-third, and II-fourth lens components are regarded as being combined together. Therefore, such a fixed arrangement of the II-fourth lens group $L_{II4}$ falls within the scope of the invention.

According to the present invention, as is apparent from the above Examples, the lens component which is moved for focusing is lightweight and can be driven by a motor having a small power, and hence consumes quite a small amount of electric power. Therefore, a single-lens reflex camera with an AF lens including a power supply, a motor and other accessories can be made small in size, light in weight, and low in cost. Contrary to the conventional system in which the front lens group is moved, the diameter of the front lens group is not required to be increased, and a sufficient amount of brightness of the edge of the image field can be ensured up to a short distance. As a result, the overall optical system is small in size. For appropriate functioning of the AF mechanism, it is necessary that the magnification of the lens component which is moved for focusing be not −1 at any time while focusing or varying power. The magnification of the lens group which is moved for focusing in any of Examples of invention is not −1 as will be understood from the following numerical values of respective Examples. Designated at f is a focal length, r a radius of curvature of each lens surface, d a lens thickness or a lens-to-lens interval, n a refractive index of each lens with respect to d-line, $\nu$ an Abbe number of each lens. The asterisk * indicates that the lens-to-lens intervals varies upon focusing.

[EXAMPLE 1]

| | | | | | |
|---|---|---|---|---|---|
| | | $F_{NO}$ 1:4 | f = 36.0–68.5 | | |
| | | r | d | n | $\nu$ |
| $L_I$ | 1 | 105.513 | 1.98 | 1.83400 | 37.2 |
| | 2 | 30.392 | 3.96 | | |
| | 3 | 79.779 | 1.88 | 1.83400 | 37.2 |
| | 4 | 34.916 | 3.90 | | |
| | 5 | 35.179 | 5.05 | 1.80518 | 25.4 |
| | 6 | 110.226 | variable* | | |
| $L_{II1}$ | 7 | 69.763 | 3.48 | 1.77250 | 49.6 |
| | 8 | −65.479 | 1.00 | 1.84666 | 23.9 |
| | 9 | −82.749 | 0.10 | | |
| | 10 | 26.956 | 3.33 | 1.78590 | 44.2 |
| | 11 | 101.679 | 2.04* | | |
| $L_{II2}$ | 12 | −155.899 | 8.16 | 1.80610 | 40.9 |
| | 13 | −72.338 | 1.10 | 1.78472 | 25.7 |
| | 14 | 21.237 | 6.23 | | |
| | 15 | −159.073 | 2.50 | 1.56732 | 42.8 |
| | 16 | −28.048 | | | |

| f | 36 | 30 | 68.5 |
|---|---|---|---|
| d6 | 41.20 | 19.07 | 3.70 |

Magnification of the II-first lens component:

| f | 36 | 50 | 68.5 |
|---|---|---|---|
| ∞ | −0.24 | −0.31 | −0.39 |
| −1/50 times | −0.25 | −0.32 | −0.40 |
| 0.6 m | — | — | −0.46 |
| 0.4 m | — | −0.38 | — |
| 0.3 m | −0.31 | — | — |

[EXAMPLE 2]

| | | | | | |
|---|---|---|---|---|---|
| | | $F_{NO}$ 1:4 | f = 36.0–68.5 | | |
| | | r | d | n | $\nu$ |
| $L_I$ | 1 | 114.159 | 1.98 | 1.83400 | 37.2 |
| | 2 | 31.314 | 4.83 | | |
| | 3 | 102.955 | 1.88 | 1.83400 | 37.2 |
| | 4 | 38.625 | 3.63 | | |
| | 5 | 37.912 | 6.00 | 1.80518 | 25.4 |
| | 6 | 159.482 | variable | | |
| $L_{II1}$ | 7 | 63.307 | 6.53 | 1.77250 | 49.6 |
| | 8 | −41.316 | 1.38 | 1.84666 | 23.9 |
| | 9 | −80.814 | 0.10 | | |
| | 10 | 29.594 | 3.27 | 1.77250 | 49.6 |
| | 11 | 70.387 | 2.49* | | |
| $L_{II2}$ | 12 | −90.022 | 8.02 | 1.51633 | 64.1 |
| | 13 | −68.087 | 1.10 | 1.67270 | 32.1 |
| | 14 | 24.009 | 3.99 | | |
| | 15 | −161.069 | 2.94 | 1.62230 | 53.2 |
| | 16 | −28.871 | | | |

| f | 36 | 50 | 68.5 |
|---|---|---|---|
| d6 | 43.70 | 19.49 | 2.67 |

Magnification of the II-second lens component:

| f | 36 | 50 | 68.5 |
|---|---|---|---|
| ∞ | 1.93 | 2.06 | 2.24 |
| −1/50 times | 1.93 | 2.06 | 2.23 |
| 0.6 m | — | — | 2.20 |
| 0.4 m | — | 2.02 | — |
| 0.3 m | 1.89 | — | — |

[EXAMPLE 3]

| | | |
|---|---|---|
| $F_{NO}$ 1:3.5–4.5 | f = 28.9–77.5 | |
| r | d | n | $\nu$ |

-continued

| | | $F_{NO}$ 1:3.5-4.5 | f = 28.9-77.5 | | |
|---|---|---|---|---|---|
| $L_I$ | 1 | 239.598 | 3.74 | 1.65830 | 57.3 |
| | 2 | −618.955 | 0.10 | | |
| | 3 | 116.304 | 2.00 | 1.83400 | 37.2 |
| | 4 | 23.780 | 9.16 | | |
| | 5 | 412.722 | 1.60 | 1.79952 | 42.2 |
| | 6 | 48.455 | 2.12 | | |
| | 7 | 38.135 | 4.26 | 1.84666 | 23.9 |
| | 8 | 170.176 | variable | | |
| $L_{II1}$ | 9 | 52.131 | 3.70 | 1.73400 | 51.5 |
| | 10 | −99.505 | 0.10 | | |
| | 11 | 23.810 | 4.04 | 1.65100 | 56.2 |
| | 12 | 64.313 | 2.69* | | |
| $L_{II2}$ | 13 | −146.487 | 8.48 | 1.80518 | 25.4 |
| | 14 | 21.372 | 2.44 | | |
| | 15 | 228.382 | 3.03 | 1.54072 | 47.2 |
| | 16 | −28.869 | | | |

| f | 28.9 | 50.2 | 77.5 |
|---|---|---|---|
| d8 | 49.90 | 16.37 | 2.53 |

| Magnification of the II-second lens component: | | | |
|---|---|---|---|
| f | 28.9 | 52.0 | 77.5 |
| ∞ | 2.04 | 2.38 | 2.76 |
| −1/50 times | 2.04 | 2.38 | 2.75 |
| 1.2 m | — | — | 2.74 |
| 0.8 m | — | 2.37 | — |
| 0.4 m | 2.03 | — | — |

[EXAMPLE 4]

| | | $F_{NO}$ 1:4 | f = 36.0-68.5 | | |
|---|---|---|---|---|---|
| | | r | d | n | ν |
| $L_I$ | 1 | 79.644 | 1.98 | 1.83400 | 37.2 |
| | 2 | 29.666 | 5.19 | | |
| | 3 | 139.212 | 1.88 | 1.83400 | 37.2 |
| | 4 | 38.301 | 3.66 | | |
| | 5 | 37.608 | 6.00 | 1.80518 | 25.4 |
| | 6 | 163.449 | variable | | |
| $L_{II1}$ | 7 | 78.378 | 3.99 | 1.77250 | 49.6 |
| | 8 | −40.348 | 1.38 | 1.84666 | 23.9 |
| | 9 | −78.774 | 0.10 | | |
| | 10 | 29.183 | 2.98 | 1.78590 | 44.2 |
| | 11 | 73.835 | 3.33* | | |
| $L_{II2}$ | 12 | −99.675 | 8.01 | 1.58913 | 61.0 |
| | 13 | −67.765 | 1.10 | 1.67270 | 32.1 |
| | 14 | 23.940 | 5.00* | | |
| $L_{II3}$ | 15 | −219.971 | 3.29 | 1.62041 | 60.3 |
| | 16 | −29.373 | | | |

| f | 36 | 50 | 68.5 |
|---|---|---|---|
| d6 | 43.20 | 19.28 | 2.67 |

| Magnification of the II-second lens component: | | | |
|---|---|---|---|
| f | 36 | 50 | 68.5 |
| ∞ | 14.04 | −53.52 | −8.14 |
| −1/50 times | 14.03 | −53.56 | −8.16 |
| 0.6 m | — | — | −8.23 |
| 0.4 m | — | −53.63 | — |
| 0.2 m | 13.95 | — | — |

[EXAMPLE 5]

| | | $F_{NO}$ 1:4 | f = 28.8-82.0 | | |
|---|---|---|---|---|---|
| | | r | d | n | ν |
| $L_I$ | 1 | 354.171 | 3.31 | 1.69100 | 54.8 |
| | 2 | −1766.39 | 0.10 | | |
| | 3 | 148.147 | 1.97 | 1.83481 | 42.7 |
| | 4 | 31.834 | 7.47 | | |
| | 5 | −609.300 | 1.94 | 1.48749 | 70.1 |
| | 6 | 26.515 | 5.93 | 1.78472 | 25.7 |
| | 7 | 50.157 | variable | | |

-continued

| | | $F_{NO}$ 1:4 | f = 28.8-82.0 | | |
|---|---|---|---|---|---|
| $L_{II1}$ | 8 | 53.467 | 4.05 | 1.62041 | 60.3 |
| | 9 | −97.436 | 0.10 | | |
| | 10 | 34.177 | 6.99 | 1.72916 | 54.7 |
| | 11 | −33.472 | 1.77 | 1.80518 | 25.4 |
| | 12 | 240.699 | variable* | | |
| $L_{II2}$ | 13 | −54.206 | 2.40 | 1.75520 | 27.5 |
| | 14 | −23.161 | 1.40 | 1.49782 | 66.8 |
| | 15 | 55.692 | 0.87 | | |
| | 16 | −259.290 | 1.22 | 1.79952 | 42.2 |
| | 17 | 92.351 | variable* | | |
| $L_{II3}$ | 18 | 133.429 | 8.20 | 1.55963 | 61.2 |
| | 19 | −15.102 | 1.52 | 1.83400 | 37.2 |
| | 20 | −37.893 | 0.10 | | |
| | 21 | 2077.730 | 2.55 | 1.83400 | 37.2 |
| | 22 | −102.532 | | | |

| f | 28.8 | 52 | 82 |
|---|---|---|---|
| d7 | 43.46 | 14.07 | 1.98 |
| d12 | 3.01 | 8.39 | 15.96 |
| d17 | 16.42 | 10.07 | 4.32 |

| Magnification of the II-second lens component: | | | |
|---|---|---|---|
| f | 28.8 | 52 | 82 |
| ∞ | 4.08 | 11.31 | −13.78 |
| −1/50 times | 4.07 | 11.29 | −13.83 |
| 1.5 m | — | — | −13.85 |
| 0.7 m | — | 11.25 | — |
| 0.3 m | 4.02 | — | — |

[EXAMPLE 6]

| | | $F_{NO}$ 1:4 | f = 28.8-82.0 | | |
|---|---|---|---|---|---|
| | | r | d | n | ν |
| $L_I$ | 1 | 358.042 | 3.37 | 1.67790 | 55.3 |
| | 2 | −1273.88 | 0.10 | | |
| | 3 | 141.158 | 1.97 | 1.88300 | 40.8 |
| | 4 | 31.662 | 7.32 | | |
| | 5 | −838.421 | 1.94 | 1.48749 | 70.1 |
| | 6 | 26.583 | 5.85 | 1.80518 | 25.4 |
| | 7 | 49.448 | variable | | |
| $L_{II1}$ | 8 | 52.059 | 3.89 | 1.67790 | 55.3 |
| | 9 | −124.768 | 0.10 | | |
| | 10 | 37.228 | 6.95 | 1.72916 | 54.7 |
| | 11 | −30.945 | 1.77 | 1.80518 | 25.4 |
| | 12 | 785.392 | variable | | |
| $L_{II2}$ | 13 | −50.586 | 2.33 | 1.76182 | 26.6 |
| | 14 | −22.313 | 1.40 | 1.51633 | 64.1 |
| | 15 | 58.770 | 0.78 | | |
| | 16 | −253.865 | 1.22 | 1.79952 | 42.2 |
| | 17 | 99.861 | variable* | | |
| $L_{II3}$ | 18 | 96.260 | 8.08 | 1.56873 | 63.1 |
| | 19 | −15.752 | 1.49 | 1.83400 | 37.2 |
| | 20 | −42.978 | 0.10 | | |
| | 21 | −1556.06 | 2.50 | 1.83400 | 37.2 |
| | 22 | −94.118 | | | |

| f | 28.8 | 52 | 82 |
|---|---|---|---|
| d7 | 42.72 | 13.97 | 2.07 |
| d12 | 3.16 | 8.59 | 16.50 |
| d17 | 17.69 | 11.69 | 6.69 |

| Magnification of the II-third lens component: | | | |
|---|---|---|---|
| f | 28.8 | 52 | 82 |
| ∞ | 0.35 | 0.11 | −0.12 |
| −1/50 times | 0.34 | 0.09 | −0.15 |
| 1.5 m | — | — | −0.21 |
| 0.7 m | — | 0.03 | — |
| 0.3 m | 0.27 | — | — |

[EXAMPLE 7]

| | | r | d | n | ν |
|---|---|---|---|---|---|
| $L_I$ | 1 | 105.513 | 1.98 | 1.83400 | 37.2 |
| | 2 | 30.392 | 3.96 | | |
| | 3 | 79.779 | 1.88 | 1.83400 | 37.2 |
| | 4 | 34.916 | 3.90 | | |
| | 5 | 35.179 | 5.05 | 1.80518 | 25.4 |
| | 6 | 110.226 | variable* | | |
| $L_{II1}$ | 7 | 69.763 | 3.48 | 1.77250 | 49.6 |
| | 8 | −65.479 | 1.00 | 1.84666 | 23.9 |
| | 9 | −82.749 | 0.10 | | |
| | 10 | 26.956 | 3.33 | 1.78590 | 44.2 |
| | 11 | 101.679 | 2.04* | | |
| $L_{II2}$ | 12 | −155.899 | 8.16 | 1.80610 | 40.9 |
| | 13 | −72.338 | 1.10 | 1.78472 | 25.7 |
| | 14 | 21.237 | 6.23* | | |
| $L_{II3}$ | 15 | −159.073 | 2.50 | 1.56732 | 42.8 |
| | 16 | −28.048 | | | |

$F_{NO}$ 1:4   f = 36.0–68.5

| f | 36 | 50 | 68.5 |
|---|---|---|---|
| d6 | 41.20 | 19.07 | 3.70 |

Magnifications of the II-first and -third lens component:

| | f | 36 | 50 | 68.5 |
|---|---|---|---|---|
| $L_{II1}$ | ∞ | −0.24 | −0.31 | −0.39 |
| | −1/50 times | −0.25 | −0.32 | −0.40 |
| | 0.6 m | — | — | −0.46 |
| | 0.4 m | — | −0.38 | — |
| | 0.3 m | −0.31 | — | — |
| $L_{II3}$ | ∞ | 0.26 | 0.10 | −0.10 |
| | −1/50 times | 0.26 | 0.10 | −0.10 |
| | 0.6 m | — | — | −0.12 |
| | 0.4 m | — | 0.08 | — |
| | 0.3 m | 0.23 | — | — |

[EXAMPLE 8]

$F_{NO}$ 1:4   f = 36.0–68.5

| | | r | d | n | ν |
|---|---|---|---|---|---|
| $L_I$ | 1 | 93.778 | 1.98 | 1.83400 | 37.2 |
| | 2 | 29.536 | 5.08 | | |
| | 3 | 110.085 | 1.88 | 1.83400 | 37.2 |
| | 4 | 38.475 | 3.14 | | |
| | 5 | 36.390 | 5.96 | 1.80518 | 25.4 |
| | 6 | 146.041 | variable | | |
| $L_{II1}$ | 7 | 83.524 | 4.07 | 1.74320 | 49.3 |
| | 8 | −36.472 | 1.38 | 1.84666 | 23.9 |
| | 9 | −65.555 | 0.10 | | |
| | 10 | 27.042 | 3.33 | 1.77250 | 49.6 |
| | 11 | 65.989 | 3.89* | | |
| $L_{II2}$ | 12 | −89.535 | 8.05 | 1.60311 | 60.7 |
| | 13 | −545.583 | 1.10 | 1.75520 | 27.5 |
| | 14 | 23.282 | 4.50* | | |
| $L_{II3}$ | 15 | 301.296 | 4.43 | 1.58267 | 46.4 |
| | 16 | −27.870 | variable | | |
| $L_{II4}$ | 17 | −225.392 | 1.60 | 1.53172 | 48.9 |
| | 18 | 481.879 | | | |

| f | 36 | 50 | 68.5 |
|---|---|---|---|
| d6 | 46.17 | 20.52 | 2.71 |
| d16 | 4.97 | 12.71 | 22.95 |

Magnification of the II-second lens component:

| f | 36 | 50 | 68.5 |
|---|---|---|---|
| ∞ | 21.73 | −19.26 | −5.93 |
| −1/50 times | 21.73 | −19.25 | −5.94 |
| 0.6 m | — | — | −6.01 |
| 0.4 m | — | −19.34 | — |
| 0.3 m | 21.64 | — | — |

As used in the claims hereafter, an "air gap" between two lens components means an air gap which is defined at one end by one of the lens components and at the other end by the other of the lens components, with no intervening lens components in the air gap.

I claim:

1. A zoom lens system having a variable focal length, said zoom lens system comprising, in order from an object: a first lens group which is the front most lens group at the object side of the zoom lens, said first lens group having a negative refractive power; and a second lens group with a positive refractive power, with a first air gap between said first and second lens groups being variable for varying said refractive power of said optical system without varying any air gaps within said first lens group, said second lens group comprising at least first, second and third lens components, said first lens component having a positive refractive power, said second lens component having a negative refractive power and said third lens component having a positive refractive power, and with a second air gap between said second and third lens components being variable for focusing without varying the refractive power of said lens, said second air gap being contiguous with said second and third lens components with no intervening lens components in said second air gap between said second and third lens components.

2. An optical lens system as claimed in claim 1, wherein said second air gap is formed between said second and third components and a third air gap is formed between said first and second components, said second component being movable for focusing to vary said second and third air gaps without varying said first air gap.

3. An optical lens system as claimed in claim 1, wherein said second air gap is formed between said second and third components and a third air gap is formed between said first and second components, and wherein said third component is movable for focusing without varying said first or third air gaps.

4. An optical lens system as claimed in claim 1, wherein said second air gap is formed between said second and third components and a third air gap is formed between said first and second components, and wherein said first and third components are movable together for focusing to vary all of said first, second and third air gaps.

5. An optical lens system as claimed in claim 1, wherein said second lens group further includes a fourth lens component having a negative refractive power, said second air gap being formed between said second and third components, a third air gap being formed between said first and second components and a fourth air gap being formed between said third and fourth components, and wherein said second component is movable for focusing to vary said second and third air gaps without varying said first or fourth air gaps.

* * * * *